United States Patent [19]
Adams

[11] 3,834,727

[45] Sept. 10, 1974

[54] STEERING GEARS

[75] Inventor: Frederick John Adams, Campton, England

[73] Assignee: Cam Gears Limited, Hertfordshire, England

[22] Filed: Mar. 21, 1972

[21] Appl. No.: 236,646

[30] Foreign Application Priority Data
Mar. 29, 1971 Great Britain.................... 8074/71

[52] U.S. Cl................. 280/96, 280/95 I, 287/85 A
[51] Int. Cl............................................. B62d 3/12
[58] Field of Search .................. 280/96, 95 R, 95 I; 287/90 R, 90 C, 87

[56] References Cited
UNITED STATES PATENTS
| | | | |
|---|---|---|---|
| 3,375,027 | 3/1968 | Ulderup | 287/90 R |
| 3,605,934 | 9/1971 | Millard | 280/96 |
| 3,650,552 | 3/1972 | Schmid | 287/90 R |

FOREIGN PATENTS OR APPLICATIONS
| | | | |
|---|---|---|---|
| 1,432,654 | 2/1966 | France | 280/96 |
| 619,605 | 3/1949 | Great Britain | 280/96 |
| 230,400 | 9/1960 | Australia | 280/96 |

Primary Examiner—David Schonberg
Assistant Examiner—Terrance L. Siemens
Attorney, Agent, or Firm—Hill, Gross, Simpson, Van Santen, Steadman, Chiara & Simpson

[57] ABSTRACT

A vehicle steering gear assembly of the type in which steering movement is imparted from a movable steering member through a tie rod member interconnected therewith by a universal joint; wherein one of the aforementioned members has an undercut part and that member is secured to the universal joint by deformation of a component part of the joint to form an interference fit with the undercut part of that member, preferably by inward deformation of a tubular component part of the joint over the undercut part of that member which the said tubular component part receives.

7 Claims, 1 Drawing Figure

PATENTED SEP 10 1974    3,834,727
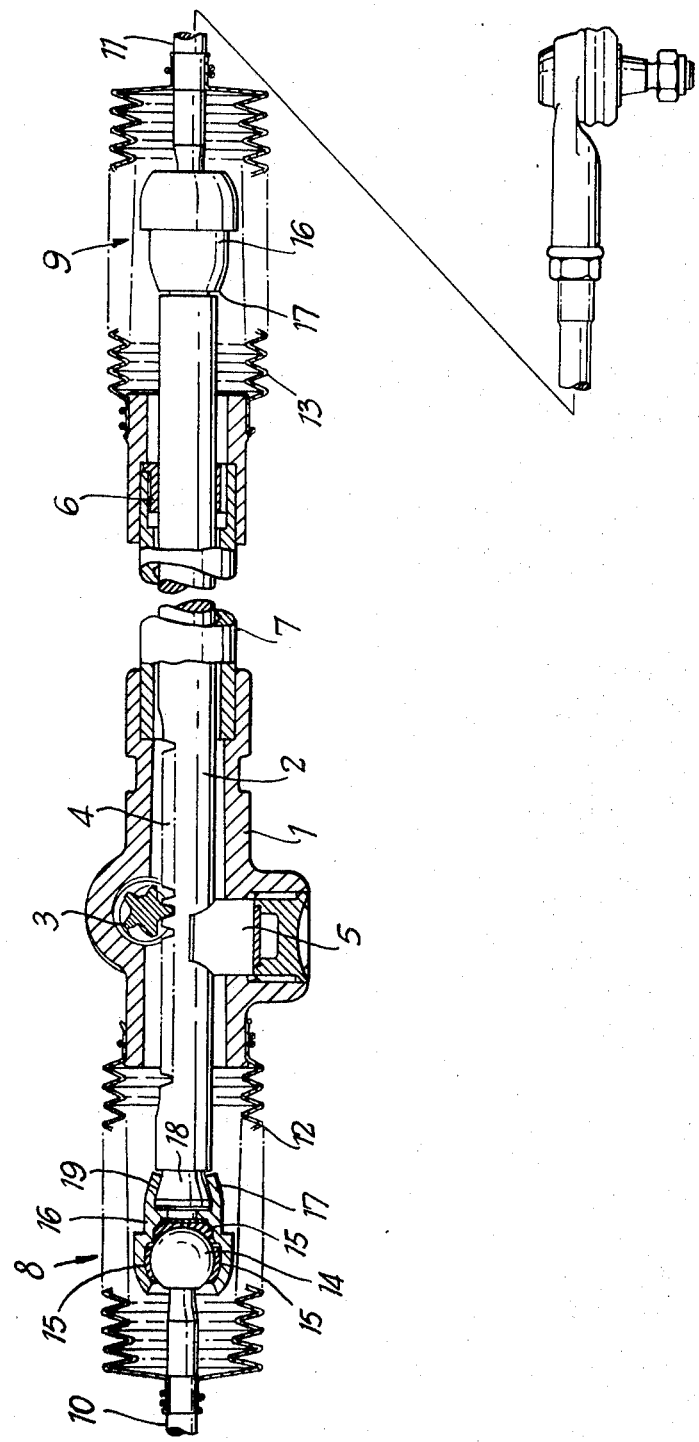

STEERING GEARS

This invention relates to vehicle steering gears and in particular to a gear assembly of the kind in which a movable steering member is interconnected through a universal joint to a tie rod member which tie rod member is intended to be coupled to impart steering movement to a steerable road wheel during movement of the steering member.

One form of steering gear of the aforementioned kind comprises a conventional rack and pinion assembly in which the rack bar member is moved by its associated pinion (either directly or indirectly as a result of rotation of the vehicle's steering wheel) and is interconnected at at least one of its ends through a universal joint to a tie rod which is intended to be coupled to a steerable road wheel. Several forms of universal joint (such as a universal "ball" or "Hooks" joint) have hitherto been proposed for use in such a steering gear assembly but in each instance it is necessary for one component part of the joint to be secured to the movable steering member and another component part of the joint to be secured to the tie rod. It is usual for one of the component parts of the joint to be formed as an integral part of the tie rod or driven steering member with which it is associated whilst the other component part is secured to its associated member (the movable steering member or the tie rod as the case may be) by pins, screws or similarly applied devices. The location and attachment of such pins, screws or similar securing devices may be a relatively expensive operation since, in general, some degree of machining accuracy is required which can be an expensive time consuming operation.

It is therefore an object of the present invention to provide a steering gear assembly of the aforementioned kind in which a universal joint connection between a tie rod member and the movable steering member can be achieved in a simple and relatively inexpensive manner.

According to the present invention there is provided a vehicle steering gear assembly in which steering movement is intended to be imparted from a movable steering member and through a tie rod member which is interconnected with said steering member by a universal joint, and wherein one of said members has an undercut part and the joint is secured to that one member by deformation of a component part of the joint to form an interference fit with the under cut part of that one member.

The invention further provides a rack and pinion steering gear assembly in which at least one end of the movable rack bar member is connected through a universal joint to a tie rod member, and wherein one of said members has an undercut condition and the universal joint is secured to that one member by deformation of a component part of the joint to form an interference fit with the undercut part of that one member.

Still further according to the present invention there is provided a method of assembling a vehicle steering gear of the kind specified in which a tie rod member is connected through a universal joint to a movable steering member, which method of assembly includes providing an undercut part on one of said members, and deforming a component part of the joint relative to the said one member sufficient to provide an interference fit between said component part and the undercut part of the said one member by which fit the joint is secured to that member.

The type of deformation which is envisaged for securing the component part of the joint to the movable steering member (or tie rod member as the case may be) preferably comprises swaging, rolling or crimping a tubular portion of the component part inwardly over an undercut part of the member received by the tubular portion.

It is usual for the steering gear assembly to be arranged so that one component part of the universal joint is integrally formed with the tie rod member and another component part of the joint is secured, in accordance with the invention, by deformation to an undercut part of the movable steering member. For example, when a universal ball joint is provided the ball component is usually integral with the tie rod whilst the ball housing is secured to the movable steering member. It will be realized however that the present invention is intended to cover the converse arrangement, for example, in which the ball is integral with the movable steering member whilst the ball housing is deformed to secure it over an undercut end part of the tie rod.

The undercut part of the member to which one component of the universal joint is secured by deformation is preferably of substantially dove-tail or wedge shape in profile (for example by providing a frusto-conical end part on a rack bar member) so that an efficient interference fit is achieved, but other convenient forms of undercutting may be used such as peripherally extending grooves, recesses or rebates in the member. Further, it is to be realised that the term "undercut" as used throughout this specification is not intended to restrict the invention to constructions in which the undercut is achieved by a machining or cutting operation, on the contrary, and for example, the undercut may be formed by an integral boss, spigot, stud or knob provided on the tie rod or movable steering member and over which the component part of the joint is deformed.

One embodiment of the present invention as applied to a rack and pinion steering gear will now be described, by way of example only, with reference to the accompanying illustrative drawing which shows the gear in part section and the ends of the rack bar connected to tie rods through universal ball joints.

In the drawing, the rack bar and pinion arrangement is of conventional construction and comprises a pinion housing 1 through which a cylindrical rack bar 2 is movable by rotation of a pinion 3 engaging with the teeth of a rack 4 machined in the rack bar. The pinion 3 is intended to be rotated either directly or indirectly and in known manner by rotation of the steering wheel of a vehicle in which the gear is incorporated. The rack bar 2 is longitudinally displaceable through the pinion housing and is supported thereby by a resiliently biased yoke member 5 which urges the teeth of the rack into engagement with the pinion. The rack bar 2 is further supported in a plain bearing 6 mounted in a tubular extension 7 of the pinion housing.

The ends of the rack bar 2 are connected through two universal ball joints 8 and 9 to tie rods 10 and 11 respectively. The tie rods are intended to be coupled in known manner to steerable road wheels of a vehicle in which the gear is incorporated so that, on longitudinal displacement of the rack bar, swivelling movement is imparted to the steerable wheels. Flexible bellows 12 and 13 are provided respectively between the tie rod 10 and housing 1, and between the tie rod 11 and extension 7, so that a sealed chamber is formed by the bellows, the extension 7 and housing 1 within which chamber the rack bar is slidable.

The construction and assembly of each of the ball joints 8 and 9 is identical and, for convenience, reference will only be made to the joint 8 which comprises a ball component part 14 integrally formed with the tie rod 10. The ball part 14 is mounted in complementary shaped seating members 15 carried in a ball housing componnet part 16. The ball housing 16 has a tubular extension 17 which is initially formed of cylindrical shape. The end of the rack bar 2 to which the joint 8 is secured is machined to present a frusto-conical profile 18 which provides an undercut part 19 at the end of the rack bar. On assembly of the steering gear, the cylindrical extension 17 of the ball housing 16 is located over the end of the rack bar to receive the frustoconical part 18 and is subsequently deformed radially inwardly by swaging, rolling or crimping against the undercut part 19 to engage and form an interference fit (as shown) with the end of the rack bar. In this way, the ball joints 8 and 9 may be simply and inexpensively secured to the rack bar whilst longitudinal displacement of the rack bar imparts sympathetic longitudinal displacement to the tie rods 10 and 11.

I claim:

1. A vehicle steering gear assembly which comprises a movable steering member, a tie rod member, a universal joint interconnecting said tie rod member with said steering member so that steering moement is imparted from the steering member through said tie rod member, said universal joint having a tubular body element with a radially inwardly directed integral flange providing opposite axially facing shoulders, said tie rod having a ball end located in one end of the tubular body element and a shank portion extending from the ball end through said one end of the tubular body element, bearing means in said one end of the tubular body element enveloping said ball end and bottomed on the shoulder of said flange facing said one end of the tubular body element, said one end of the tubular body element converging radially inward around said shank of the tie rod to cooperate with said flange in maintaining the bearing means around said ball end, said movable steering member having an end portion projecting into the opposite end of said tubular body member with an end face bottomed against the shoulder of the flange opposite the shoulder bottoming the bearing means, said end portion of the steering member having an undercut portion converging from the end face bottomed on said flange, and said opposite end of the tubular body element being deformed inwardly over said undercut portion of the steering member to lock the universal joint against rotation or axial movement relative to said steering member.

2. The vehicle steering gear assembly of claim 1 wherein the end portion of the tubular body element receiving the end of the steering member is swaged radially inward on said converging portion of the steering member to bottom said flange against the end of the steering member.

3. The assembly of claim 1 wherein the movable steering member is a rack bar of a rack and pinion steering gear.

4. A joint and workpiece assembly which comprises a tubular body member having a radially inward directed flange intermediate the ends thereof, a ball ended stud member having a ball end located in one end of said tubular body element and a shank projecting from said one end of the tubular body element, an elastomeric bearing means in said one end of the tubular body element bottomed on said flange and enveloping said ball end of the stud member, the end of the tubular body element receiving the stud shank therethrough converging inwardly around said shank to cooperate with said flange in holding the bearing means around the ball end and against axial movement in the tubular body element, a workpiece extending into the other end of said tubular body element bottomed on said flange, said workpiece having an annular undercut portion, and said other end of the tubular body member swaged into load bearing non-rotating engagement with said workpiece holding the flange against the end of the workpiece to prevent axial movement between the workpiece and ball stud.

5. The assembly of claim 4 wherein the bearin means includes a first ball seat bottomed on the end of the tubular body element receiving the stud shank therethrough and a second ball seat bottomed on said flange.

6. The assembly of claim 4 wherein the annular undercut portion of the workpiece is a frusto-conical head with the base bottomed on said flange.

7. The assembly of claim 4 wherein the flange has an interference fit with the end of the workpiece.

* * * * *